United States Patent Office 3,824,105
Patented July 16, 1974

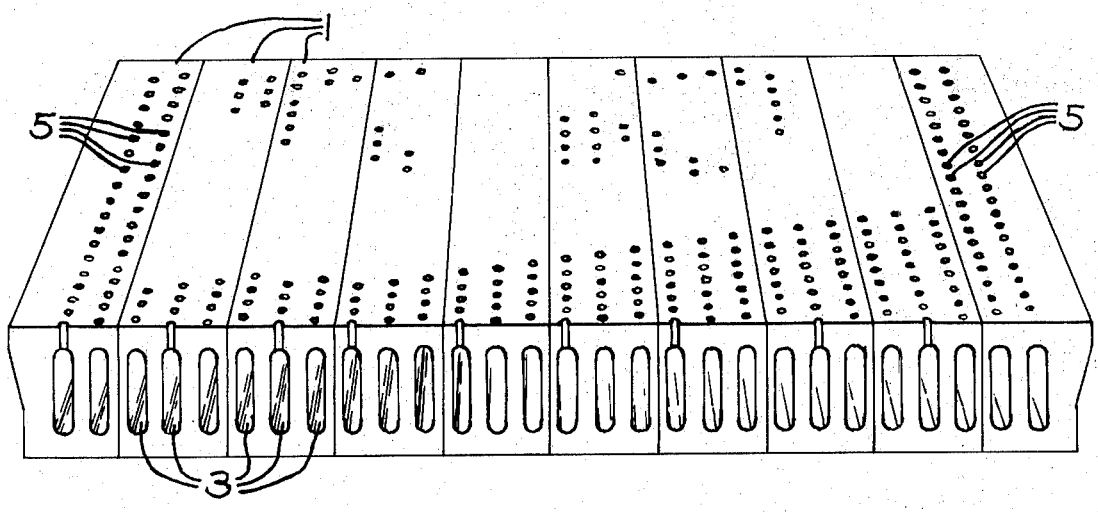

3,824,105
HYDRAULIC-SETTING BONDING AGENT AND REFRACTORY COMPOSITIONS MADE THEREFROM
John J. Capellman, Tarentum, James C. Stultz, Lower Burrell, and Joseph E. Cooper, Brackenridge, Pa., assignors to PPG Industries, Inc., Pittsburgh, Pa.
Filed June 4, 1973, Ser. No. 366,890
Int. Cl. C04b 35/02, 35/14
U.S. Cl. 106—64    18 Claims

ABSTRACT OF THE DISCLOSURE

Disclosed is a hydraulic-setting bonding agent comprising a hydraulic-setting calcium aluminate and nepheline syenite. The bonding agent can be combined with water and an aggregate such as fused silica to form a castable refractory composition which may be cast and hardened to form a refractory body such as a gas hearth module. The nepheline syenite increases the cold strength provided by the hydraulic-setting calcium aluminate.

BACKGROUND OF THE INVENTION

Field of the Invention

This invention relates to refractory compositions, particularly castable refractories containing fused silica, and especially relates to improvements in such compositions containing hydraulic-setting calcium aluminate cement.

Brief Description of the Prior Art

Calcium aluminate is a hydraulic-setting cement which is used as a bonding agent for various aggregates and insulating materials. Compositions in which hydraulic-setting calcium aluminate is the bonding agent produce unfired refractory articles which have lower strengths than corresponding refractory articles made using Portland cement as the bonding material. However, the refractory articles made with calcium aluminate as the bonding agent retain more of their strength after firing to higher temperatures than is the case with the refractory bodies using Portland cement as the bonding agent. Unfortunately, compositions made with calcium aluminate cement as the bonding agent have produced refractory articles of such low strength which are so fragile in the unfired condition that chipping of the articles occurs during handling.

The prior art has recognized the problem of poor cold strength in refractory compositions containing calcium aluminate cements and has offered numerous solutions to the problems. Examples of the most pertinent prior art in the area are the following: U.S. Pats. 2,416,700 to Kocher, 2,511,724 to Lobaugh, 2,511,725 and 2,516,892, both to Lobaugh, 2,793,128 to Emhiser and 3,060,043 to Renkey.

SUMMARY OF THE INVENTION

According to this invention, there is provided a hydraulic-setting bonding agent consisting essentially of a hydraulic-setting calcium aluminate and nepheline syenite. The nepheline syenite is present in a concentration of 5 to 50 percent by weight based on the weight of the hydraulic-setting calcium aluminate and nepheline syenite. The nepheline syenite increases the fired cold flexural strength provided by the hydraulic-setting calcium aluminate. The bonding agent can be combined with an aggregate such as fused silica to provide a refractory such as the following, on a weight basis:

|  | Percent |
| --- | --- |
| Fused silica | 60–80 |
| Hydraulic-setting calcium aluminate | 15–38 |
| Nepheline syenite | 2–15 |

This refractory composition when combined with 9 to 18 percent by weight water forms a fluid castable refractory composition which can be cast and hardened to form a refractory body such as a gas hearth module.

Other Pertinent Prior Art

U.S. Pat. 3,313,007 to James discloses a refractory composition containing 80 to 95 percent by weight of nepheline syenite and minor amounts of sodium silicate (3 to 10 percent) and calcium aluminate (2 to 10 percent). U.S. Pat. 3,389,002 to Huffcut discloses a refractory coating composition containing minor amounts of nepheline syenite (1 to 7 percent) but without a hydraulic cement component. Nepheline syenite is a known additive to ceramic and glass compositions as is evidenced by U.S. Pat. 2,898,217 to Selsing which discloses nepheline syenite as an additive to a ceramic mix and U.S. Pat. 3,524,738 to Grubb which discloses nepheline syenite added to a glass composition.

Brief Description of the Drawing

The drawing is a perspective view of gas hearth modules made from the refractory composition of this invention.

Detailed Description

The bonding agent of the invention comprises a hydraulic-setting calcium aluminate and nepheline syenite. Hydraulic-setting calcium aluminate is a cementitious material well known in the art. It is one whose major constituents are calcium aluminates $$(CaO \cdot Al_2O_3, CaO \cdot 2Al_2O_3)$$

and is sometimes referred to as high alumina cement, calcium aluminate cement, aluminous cement or fused cement. Typical hydraulic-setting calcium aluminates which are contemplated by the invention would have compositions within the following ranges, the constituents being expressed as percentages by weight based on total weight of the cement after drying at 212° F.:

| Constituent | Percent by Weight |
| --- | --- |
| $Al_2O_3$ | 30–85 |
| CaO | 10–25 |
| FeO | 0.1–20 |
| $Fe_2O_3$ | 0.1–15 |
| $SiO_2$ | 0.1–2 |
| MgO | 0–0.3 |

Ignition loss—negligible.

Trace materials such as $TiO_2$, MnO, $Na_2O$, $SO_3$, $P_2O_5$, up to concentrations of 0.5 percent by weight can also be present in hydraulic-setting calcium aluminate depending upon the source and the supplier.

The preferred calcium aluminate cement is one available commercially from the Aluminum Company of America under the trade name CA-25 cement. It is a cement of high purity in which the CaO to $Al_2O_3$ ratio by weight is about 1:4 and which has the following composition by weight, based on total weight of the cement, after drying at 212° F.

| Constituent | Percent by Weight |
| --- | --- |
| $Al_2O_3$ | 79 |
| CaO | 18.0 |
| FeO | 0.3 |
| $Fe_2O_3$ | 0.1 |
| $SiO_2$ | 0.4 |
| MgO | 0.5 |
| $Na_2O$ | 1.5 |

Ignition loss—negligible.

The nepheline syenite when combined with the calcium aluminate cement has been found to improve the bonding properties of the cement for such materials as refractory aggregates. In particular, the nepheline syenite increases the fired cold flexural strength which is provided by the hydraulic-setting calcium aluminate. Nepheline syenite is a commercially available ceramic material which comprises a mixture of several different sodium aluminum silicates and potassium alumina silicates. It is an igneous rock composed chiefly of the mineral nepheline $$(Na_6K_2Al_8Si_9O_{34})$$

mixed with albite ($NaAlSi_3O_8$), microcline ($K_2Al_2Si_6O_9$) and orthoclase ($KAlSi_3O_8$). The native rock does not contain quartz. The commercially available nepheline syenite contains on a weight basis, about 60 percent silica, 24 percent alumina, 10 percent soda and 5 percent potash. The amount of nepheline syenite combined with the calcium aluminate cement should be about 5 to 50 percent and preferably 15 to 40 percent by weight based on the total weight of the calcium aluminate cement and the nepheline syenite. Higher percentages of nepheline syenite result in refractory compositions with higher expansion coefficients, while lower concentrations result in decreased cold strength in the resultant refractory.

Besides the binder component of calcium aluminate cement and nepheline syenite, described above, the castable refractory compositions of this invention contain a refractory aggregate material. The refractory aggregate may be fire clay grog, crushed fire brick, expanded shale, olivene, fused alumina, chrome ore, magnesite, fused silica, vitreous silica and mixtures of these various aggregates, with fused silica being preferred because of its superior high temperature-resistant properties and its low coefficient of thermal expansion. Fused silica differs from conventional glass-making silica principally in its crystalline content. Glass-making silica has an appreciable crystalline content in the form of quartz, tridymite and cristobalite, whereas fused silica, which is made by passing an electric arc through a glass-making silica, is essentially 98 percent or more amorphous.

In the description which follows, the refractory aggregate exemplified is fused silica. However, it should be clear that other refractory aggregates such as those mentioned above or various mixtures of refractory aggregates with or without fused silica could also be used.

The proportions of refractory aggregate, calcium aluminate cement and nepheline syenite which should be used relative to one another are as follows: 60–80 percent, preferably about 70–77.5 percent, fused silica, 15–38 percent, preferably 17½ to 20 percent, hydraulic-setting calcium aluminate, and 2–15 percent, preferably 5 to 7½ percent, nepheline syenite. The above proportions are on a percentage by weight basis being based on the total weight of the refractory composition.

Using a greater than 80 percent fused silica is not recommended because there will be too little binder present to get effective binding and strength in the resultant refractory article. Using less than 60 percent is also not recommended because of the poor refractory properties which would result in the resultant refractory article. The amounts of calcium aluminate cement and nepheline syenite should also be controlled within the above-disclosed ranges. Higher proportions of either component than those recommended will result in refractory articles with higher coefficients of thermal expansion than desired. Lower contents of the calcium aluminate cement and nepheline syenite than those disclosed in the above ranges result in a refractory article with poor bonding and strength.

Besides the chemical identity and the proportions of the various ingredients, particle size distribution of the ingredients is also important. When the ingredients are of a fine particle size, there is denser packing of the particles with fewer gross voids. A graduated sizing of the particulate ingredients gives the densest packing. Too fine a particle size distribution leaves many fine pores throughout the resultant casting while too gross a particle size distribution leaves many large pores. A graduated particle size distribution is best. With a graduated particle size distribution, the calcium aluminate cement does not have to fill voids, but simply is used as a layer between the individual particles, thereby exerting a greater adhesive strength with the closely packed finer particles than with loosely packed coarser particles. Of course, getting finely ground materials is very expensive so usually a balance is sought between fine grinding and the added expense involved.

With fused silica, the following particle size distribution has been found to be desirable. About 60 to 75 percent by weight based on total weight of the fused silica should pass through an 8 and be held on a 40 mesh screen; the mesh sizes being Tyler Standard Sieve Series. The remaining 25 to 40 percent of the fused silica should pass through a 100 mesh screen and of that amount, about 60 to 90 percent by weight should be held on a 325 mesh screen and 10 to 40 percent should pass through a 325 mesh screen. A typical cumulative screen analysis of the fused silica ingredient is set forth in tabular form below.

| Tyler Standard Screen | 60–75 percent by wt. of the fused silica | 25–40 percent by wt. of the fused silica |
|---|---|---|
| Held on 8 mesh | 3 percent | |
| Held on 10 mesh | 7 percent | |
| Held on 16 mesh | 40 percent | |
| Held on 20 mesh | 72 percent | |
| Held on 30 mesh | 95 percent | |
| Held on 40 mesh | 99 percent | |
| Held on 100 mesh | | 0.2 percent. |
| Held on 140 mesh | | 3.2 percent. |
| Held on 170 mesh | | 10.8 percent. |
| Held on 200 mesh | | 21.9 percent. |
| Held on 325 mesh | | 32.2 percent. |
| Through 325 mesh | | 79.6 percent. |
| | | 21.6 percent. |

The nepheline syenite should also be finely divided. The more finely divided nepheline syenite provides for better cold flexural strength in the resultant casting. Practically 100 percent of the nepheline syenite should pass through 100 mesh and of that amount about 10 to 30 percent by weight should pass through a 325 mesh screen. In other words, about 70 to 90 percent of the nepheline syenite should be between 100 and 325 mesh and about 10 to 30 percent through 325 mesh. A typical cumulative screen analysis for the nepheline syenite is a follows:

| Tyler Standard Screen Held on | Percent, 100 Percent by Weight Nepheline Syenite |
|---|---|
| 40 mesh | 0.2 |
| 100 mesh | 1.9 |
| 140 mesh | 8.4 |
| 170 mesh | 21.1 |
| 200 mesh | 33.3 |
| 325 mesh | 83.2 |
| Through 325 mesh | 16.8 |

The commercially available calcium aluminate cements are finely particulated so that they pass through a 200 mesh screen. Further particulation is not required.

When all the ingredients have been mixed together, about 90 to 100 percent by weight of the mixture based on the total weight of the mixture should pass through a 10 mesh screen and 30 to 50 percent should pass through a 100 mesh screen, 10 to 30 percent should pass through a 200 mesh screen and 2 to 10 percent should pass through a 325 mesh screen. About 48 to 73 percent by weight of the mixture based on the total weight of the mixture should pass through 10 and be held on 100 mesh screen, 25 to 50 percent by weight should pass through a 100 mesh screen and be held on a 325 mesh screen, and about 2 to 10 percent by weight of the total batch should pass through a 325 mesh screen.

Typical screen analyses for batch compositions containing 75 percent by weight fused silica combined with (1) 20 percent by weight calcium aluminate and 5 percent by weight nepheline syenite, and (2) 17½ and 7½ percent by weight calcium aluminate and nepheline syenite, respectively, are given below.

| Tyler Standard Sieve | 75% fused silica, 20% calcium aluminate, 5% nepheline syenite | 75% fused silica, 17½% calcium aluminate, 7½% nepheline syenite |
| --- | --- | --- |
| Held on 10 mesh | 3.5 percent | 3.0 percent. |
| Held on 16 mesh | 18.2 percent | 17.5 percent. |
| Held on 20 mesh | 31.3 percent | 30.0 percent. |
| Held on 30 mesh | 43.3 percent | 41.0 percent. |
| Held on 40 mesh | 50.3 percent | 48.0 percent. |
| Held on 100 mesh | 58.8 percent | 56.2 percent. |
| Held on 140 mesh | 68.1 percent | 64.5 percent. |
| Held on 170 mesh | 71.1 percent | 71.5 percent. |
| Held on 200 mesh | 77.6 percent | 76.0 percent. |
| Held on 325 mesh | 95.0 percent | 95.5 percent. |
| Through 325 mesh | 5.0 percent | 4.5 percent. |

After the fused silica and nepheline syenite have been particulated to their proper size, they are usually mixed together in a dry mixer such as an AMF Glen mixer for a sufficient period of time to distribute evenly the two ingredients throughout each other. Mixing times of about 5 to 20 minutes depending on the size of the mix and of the mixer are usually satisfactory. To this mixture is added a calcium aluminate cement and mixing is usually continued for an additional 5 to 20 minutes. To this mixture is then added water to make a fluid castable composition. The amount of water which is needed will depend principally on the fluidity that is required in the mix. A castable composition which is not fluid enough or, in other words, is too viscous, is difficult to handle and does not charge well to a complex design. Air entrapment occurs resulting in voids in the casting. Also, the castable composition must not be too fluid or too thin. With too thin a composition, the water has a tendency to rise to the top of the casting carrying with it most of the fines. As a result, the strength of the resultant casting is poorer than desired.

The fluidity of the castable composition can be determined by a vibrating inclined flow meter. The flow meter basically comprises a graduated cylinder in combination with a vibrator. The graduated cylinder is about 8⅜ inches high, has an internal diameter of about 2¾ inches, and is graduated in inches. The vibrator is a Syntron electric vibrator Type V-4, style 1518, 110 volts-60 cycles, available from the Syntron Company, Homer City, Pa. The graduated cylinder is filled with about 200 cubic centimeters of the castable composition. The filled graduated cylinder is then disposed in a horizontal position on the deck of the vibrator and vibrated for 30 seconds. The distance the castable refractory travels down the graduated cylinder is reported as the measure of its fluidity.

It has been found that castable compositions of this invention should have fluidities as measured by the above-described method within the range of 4 to 6 inches in 30 seconds with higher fluidities within the above range being needed for casting of complex refractory shapes such as gas hearth modules. With simpler shapes, such as simple refractory bricks, lower fluidities can be used.

To achieve the desired fluidities, about 9 to 18 percent, and preferably 11 to 13 percent by weight water should be added to the mixture of fused silica, calcium aluminate and nepheline syenite, the percentage of water being based on the total weight of the fluid composition. Using less than 9 percent by weight water, the castable composition is very viscous and difficult to cast. Using greater than 18 percent by weight water results in very poor strength in the resultant refractory casting. The time of mixing should be sufficient to form a homogeneous hydraulic mixture having the desired fluidity but should not be longer than about 5 minutes. Good mixing promotes strength, but overmixing can weaken the resultant refractory body because it breaks hydraulic bonds which begin to form. The temperature of the water should be kept low, that is, below 70° F., and preferably within the range of 40 to 60° F., so as to retard the set of the cement and provide a longer working time.

After the water has been added and mixed, the fluid composition is ready for casting, which is accomplished by pouring the fluid composition into a mold which consists of any suitable material such as wood, metal or composition board having a cavity which will cause the fluid mixture to take the shape desired. A parting agent, such as grease, oil or polyethylene wax, should be applied to the interior surface of the cavity before the fluid composition is cast. The castable mixture is poured into the mold cavity, preferably being added in small portions with each portion being firmly packed into the cavity by using any suitable device such as a pneumatic reamer or a vibrator until the last portion is added and packed so that the cavity is completely filled. Progressively packing in this manner, after each portion of the fluid mixture is added, serves to eliminate voids in the cavity of the mold assembly. The mold with the castable mixture contained therein is permitted to set at room temperature for approximately 24 hours to permit the material to set up like concrete. The casting is usually covered with moist rags or the like during setting to minimize the loss of water through evaporation.

After the casting has set overnight, it can be used immediately or it can be fired. If the casting is to be used without firing, it is referred to as a "green casting" and it should be heated to a slightly elevated temperature to remove excess water before using. A temperature of 200–250° F. for one to five hours is usually suitable depending on the size and shape of the casting. Usually, however, the refractory is fired before use to improve its abrasion resistance. Firing is usually conducted by heating the casting to a temperature above that which it will encounter in use. For example, with a gas hearth module, the gas hearth bed is usually operated at a temperature of about 1500° F. The fused silica refractories of this invention should be fired at a temperature greater than 1500° F., but no higher than 2300° F. and generally at a temperature between 2000 and 2100° F. At a temperature of 2300° F., the fused silica rapidly converts to cristobalite, which has a much higher thermal expansion coefficient than fused silica. The phase change of amorphous fused silica to cristobalite is a time-temperature phenomenon and although very rapid at 2300° F., is sufficiently slower at a temperature of 2000–2100° F. to make firing at these temperatures practical.

The time of firing depends upon the mass of material cast and the size of the kiln and may range from one day to one week. For example, 9 inch by 4½ inch by 2½ inch refractory bricks made with the fused silica refractories of this invention are usually fired at a temperature of 2100° F. for 2 hours and larger shapes such as the gas hearth modules shown in the drawing and having dimensions of 72 inches by 48 inches by 8 inches should be fired at a temperature of 2100° F. for about 4 to 8 hours.

The drawing shows a plurality of gas hearth modules 1 adjacent to one another to form a gas hearth bed. Typical beds have dimensions of about 72 inches by 48 inches by 8 inches. Passages 3 extend across the modules and are in communication with holes 5. Heated air from an external source (not shown) is pumped into the passage 3 from where it flows out through orifices 5 to heat and support a sheet of flat glass. For a description of thermally tempering glass on a gas hearth bed, see U.S. Pat. 3,223,501 to Fredley et al.

EXAMPLE I

Description of the preferred embodiment

A gas hearth bed was prepared as follows: 1500 pounds of a fused silica grog which is commercially available from Glasrock Products Inc. and having the following particle size distribution:

Tyler Standard Sieve
Series, Held on | Percent by Weight
--- | ---
8 mesh | 3.0
10 mesh | 7.0
16 mesh | 4.0
20 mesh | 72.0
30 mesh | 95.0
40 mesh | 99.0 were split into two portions. One portion of about 500 pounds was further particulated in a ball mill for 180–240 minutes to give a silica grog having the following particle size distribution:

Tyler Standard Sieve
Series, Held on | Percent by Weight
--- | ---
40 mesh | 0.2
100 mesh | 3.2
140 mesh | 10.8
170 mesh | 21.9
200 mesh | 32.2
325 mesh | 79.6
Through 325 mesh | 21.6

The two portions of the silica grog were then recombined and mixed with 150 pounds of nepheline syenite having the following particle size distribution:

Tyler Standard Sieve Series
Held on: | Percent by Weight
--- | ---
40 mesh | 0.2
100 mesh | 1.9
140 mesh | 8.4
170 mesh | 21.1
200 mesh | 33.3
325 mesh | 83.2
Through 325 mesh | 16.8 in an AMF Glen mixer for 10 minutes. To this mixture were added 350 pounds of calcium aluminate cement which is commercially available from Aluminum Company of America under the trade name CA-25. The calcium aluminate was mixed with the fused silica and nepheline syenite for about 10 minutes. The mixture of fused silica, nepheline syenite and calcium aluminate had the following particle size distribution:

Tyer Standard Sieve Series
Held on: | Percent by Weight
--- | ---
10 mesh | 3.0
16 mesh | 17.5
20 mesh | 30.0
30 mesh | 41.0
40 mesh | 48.0
100 mesh | 56.2
140 mesh | 64.5
170 mesh | 71.5
200 mesh | 76.0
325 mesh | 95.9
Through 325 mesh | 4.5

The screen analyses given above were cumulative screen analyses. The above composition contained 75 percent by weight fused silica, 17.5 percent calcium aluminate cement and 7.5 percent nepheline syenite. To this mixture were added 250 pounds of water (12½ percent by weight water based on total weight of the dry mixture) at a temperature of 70° F. Mixing was continued for an additional 5 minutes until the hydraulic mixture had the proper flow characteristics, that is, until it had a flow of about 5 inches in 30 seconds as determined by measurement on the vibrating flow meter described above. The mixture was then cast into a vibrating 4 foot by 6 foot by 8 inch wooden mold which had been coated on the interior surfaces with an axle grease release agent. The mold had brass inserts which corresponded to the hollow portions of the gas hearth modules shown in the drawing. The hydraulic mixture was set for two hours at room temperature in the mold. The mold was then covered with damp cloths to prevent rapid moisture loss at the exposed surface and the hydraulic mixture was set for an additional 24 hours. The casting was then removed from the mold and the inserts were removed from the casting to give a refractory shape suitable for use as a gas hearth module.

Before use, the casting was fired to increase its abrasion resistance and its cold flexural strength. The casting was fired by heating it in a kiln from room temperature to about 1200° F. at a rate of about 50° F. an hour. This slow rate of heating insures the complete removal of excess water without cracking the refractory. The temperature was then raised at a rate of about 100° F. per hour to 2100° F., where the temperature was maintained for about eight hours. The kiln was then slowly cooled at furnace rate to room temperature.

EXAMPLE II

A solid refractory brick (2½ inches by 4½ inches by 9 inches) suitable for testing for cold flexural strength as described in A.S.T.M. C–133–39 was prepared as generally described above in Example I. The refractory contained on a weight basis 75 percent fused silica, 17½ percent calcium aluminate and 7½ percent nepheline syenite. The cold flexural strength as measured by A.S.T.M. C–133–39 was 850 pounds per square inch.

EXAMPLE III

A second solid refractory brick (2½ inches by 4½ inches by 9 inches) suitable for testing for cold flexural strength as described in A.S.T.M. C–133–39 was prepared as generally described above in Examples I and II. The refractory contained on a weight basis 75 percent fused silica, 20 percent calcium aluminate and 5 percent nepheline syenite. The cold flexural strength as measured by A.S.T.M. C–133–39 was 800 pounds per square inch.

EXAMPLE IV

A third refractory brick similar to those of Examples II and III was prepared with the exception that it contained no nepheline syenite. The brick contained on a weight basis 75 percent fused silica and 25 percent calcium aluminate. The sample had a cold flexural strength of only 511 pounds per square inch.

We claim:

1. A composition comprising a hydraulic-setting bonding agent consisting essentially of a hydraulic-setting calcium aluminate and nepheline syenite; the nepheline syenite being present in a concentration constituting about 5 to 50 percent by weight of the weight of the hydraulic-setting calcium aluminate and nepheline syenite.

2. The composition of Claim 1 wherein the concentration of nepheline syenite is between 15 to 40 percent by weight.

3. The composition of Claim 1 which further includes an aggregate.

4. The composition of Claim 3 in which the aggregate is fused silica.

5. A refractory composition comprising on a weight basis:

| | Percent |
--- | ---
Fused silica | 60–80
Hydraulic-setting calcium aluminate | 15–38
Nepheline syenite | 2–15 the percentages by weight being based on the total weight of the fused silica, hydraulic-setting calcium aluminate and nepheline syenite.

6. The refractory composition of Claim 5 containing on a weight basis:
   (a) 70–77.5 percent fused silica,
   (b) 17.5–20 percent by weight hydraulic-setting calcium aluminate, and
   (c) 5–7.5 percent by weight nepheline syenite.

7. A fluid composition suitable for forming a refractory article comprising an aggregate, water and a hydraulic-setting bonding agent consisting essentially of a hydraulic-setting calcium aluminate and nepheline syenite, the nepheline syenite being present in a concentration of 5 to 50 percent by weight based on the weight of hydraulic-setting calcium aluminate and nepheline syenite.

8. The fluid of Claim 7 wherein the aggregate is fused silica.

9. The fluid composition of Claim 7 wherein the concentration of nepheline syenite is between 15 to 40 percent by weight.

10. The fluid composition of Claim 7 containing on a weight basis:

| | Percent |
|---|---|
| Fused silica | 60–80 |
| Hydraulic-setting calcium aluminate | 15–38 |
| Nepheline syenite | 2–15 | the percentages by weight being based on the total weight of the fused silica, hydraulic-setting calcium aluminate and nepheline syenite, and also containing 9 to 18 percent by weight water, the amount of water being based on the total weight of the composition.

11. The fluid composition of Claim 10 containing on a weight basis:
 (a) 70–77.5 percent fused silica,
 (b) 17.5–20 percent hydraulic-setting calcium aluminate, and
 (c) 5–7.5 percent nepheline syenite,
the percentages by weight being based on the weights of fused silica, hydraulic-setting calcium aluminate and nepheline syenite and also containing about 11 to 13 percent by weight water based on total weight of the fluid composition.

12. A refractory body comprising an aggregate bonded by a hydraulic-setting bonding agent consisting of calcium aluminate and nepheline syenite, the nepheline syenite constituting from about 5 to 50 percent by weight of the hydraulic-setting calcium aluminate and the nepheline syenite.

13. The refractory body of Claim 12 wherein the aggregate is fused silica.

14. The refractory body of Claim 12 wherein the amount of nepheline syenite is between 15 to 40 percent by weight.

15. A hydraulic-setting refractory body comprising on a weight basis:
 (a) 60–80 percent fused silica bonded by
 (b) 15–38 percent of calcium aluminate, and
 (c) 2–15 percent nepheline syenite,
the percentages by weight being based on total weight of fused silica, hydraulic-setting calcium aluminate and nepheline syenite.

16. The refractory body of Claim 15 comprising:
 (a) about 70–77.5 percent fused silica bonded by
 (b) 17.5–20 percent hydraulic-setting calcium aluminate, and
 (c) 5–7.5 percent nepheline syenite.

17. The refractory body of Claim 15 in the form of a gas hearth module.

18. The gas hearth module of Claim 17 which is arranged with other gas hearth modules to form a gas hearth bed.

References Cited

UNITED STATES PATENTS

| | | | |
|---|---|---|---|
| 2,416,700 | 3/1947 | Kocher | 106—64 |
| 2,511,724 | 6/1950 | Lobaugh | 106—64 |
| 2,511,725 | 6/1950 | Lobaugh | 106—64 |
| 2,516,892 | 8/1950 | Lobaugh | 106—64 |
| 2,736,660 | 2/1956 | Barlow | 106—69 |
| 2,793,128 | 5/1957 | Emhiser | 106—64 |
| 3,060,043 | 10/1962 | Renkey | 106—64 |
| 3,313,007 | 4/1967 | James et al. | 106—64 |
| 3,389,002 | 6/1968 | Huffcut | 106—69 |
| 3,607,325 | 9/1971 | Spangler et al. | 106—64 |

JAMES E. POER, Primary Examiner

U.S. Cl. X.R.

106—68, 69, 104